United States Patent [19]

Nuechterlein et al.

[11] Patent Number: 4,876,644
[45] Date of Patent: Oct. 24, 1989

[54] PARALLEL PIPELINED PROCESSOR

[75] Inventors: David W. Nuechterlein; Mark A. Rinaldi, both of Durham, N.C.

[73] Assignee: International Business Machines Corp., Armonk, N.Y.

[21] Appl. No.: 331,021

[22] Filed: Mar. 28, 1989

Related U.S. Application Data

[63] Continuation of Ser. No. 115,150, Oct. 30, 1987, abandoned.

[51] Int. Cl.[4] .......................... G06F 9/28; G06F 9/38
[52] U.S. Cl. ................................ 364/200; 364/244.3; 364/254.5; 364/231.8
[58] Field of Search ... 364/200 MS File, 900 MS File

[56] References Cited

U.S. PATENT DOCUMENTS

| | | | |
|---|---|---|---|
| 4,395,698 | 7/1983 | Sternberg et al. | 382/27 |
| 4,550,437 | 10/1985 | Kobayashi et al. | 382/41 |
| 4,594,660 | 6/1986 | Guenthner et al. | 364/200 |
| 4,649,512 | 3/1987 | Nukiyama | 364/900 |

Primary Examiner—Gareth D. Shaw
Assistant Examiner—Jonathan C. Fairbanks
Attorney, Agent, or Firm—John B. Frisone

[57] ABSTRACT

A processor adapted for parallel and/or pipelined interconnection with other like processors. An arithmetic logic unit has associated with it an output FIFO register stack having output data lines capable of parallel connection with the output data lines of other such processors, such output stack being loadable with a predetermined neutral value such that when the neutral value is present at their output data lines it permits the data present at the output lines of another such processor connected in parallel therewith to control the output data bus. The invention eliminates the need to have control over several such processors connected in parallel and/or pipelined configuration by way of external arbitration logic.

2 Claims, 10 Drawing Sheets

$$\text{EMPTY}_{t+1} = (\text{WRAP} \wedge \text{INC\_READ}) + (\overline{\text{WRAP}} \wedge \text{EMPTY}_t)$$

$$\text{FULL}_{t+1} = (\text{WRAP} \wedge \overline{\text{INC\_READ}}) + (\overline{\text{WRAP}} \wedge \text{FULL}_t)$$

OFV IS OUTPUT FIFO VALID. IT INDICATES THAT THE
FIFO CONTAINS AT LEAST ONE
VALID DATA ITEM.

PARALLEL PIPELINED PROCESSOR

This is a continuation of application Ser. No. 07/115,140, filed Oct. 30, 1987, now abandoned.

BACKGROUND OF THE INVENTION

1. Field of the Invention

The present invention relates to parallel computer processing, and more particularly relates to an improved processor and parallel and/or pipeline configuration thereof.

2. Background Art

Computer graphics algorithm advances are placing increasing demands on the processing systems therefor, for example due to the complex matrix multiplications involved in the transformations performed on graphics data elements. These demands have led to discussions, regarding configuring processors, usually microprocessors, in parallel and/or pipeline configurations so as to perform this processing in a more efficient and rapid manner.

A geometry processor for graphics processing is disclosed in "A VLSI Geometry Processor for Graphics," James Clark, Computer, July 1980, pages 59-68. The processor disclosed therein includes an ALU, three registers and a stack, and is designed to do parallel adds, subtracts, and similar two-variable operations. It is designed for parallel arrangement for matrix multiplication. However, programming of, and control of the processor described in the Clark article is complex, requiring external arbitration logic.

It is an object of the present invention to provide a processor, such as a microprocessor, capable of being connected in parallel and/or pipeline, that is relatively easy to program and to control in the execution of complex mathematical operations, such as matrix multiplications, as compared with prior art processors.

SUMMARY OF THE INVENTION

According to the present invention a processor is provided comprising an arithmetic logic unit, and in addition an output first-in first-out register stack having data lines capable of parallel connection with the output data lines of other such processors. These output data lines are of an electronic configuration such that their data will be present when so connected in parallel with the other such processors, provided that the other processors have a predetermined neutral value present at their output data lines.

This novel processor configuration permits the interconnection of such processors to form a larger computer system. According to this aspect of the invention, a computer system has a plurality of such processors, having their inputs connected in parallel to an input bus, and having their outputs connected in, for example, wire AND, and in addition having system elements for providing input data and control data for a portion of computation to be performed in one clock cycle on the input bus. The control data controls each of the processors to respectively compute the portion of computation allocable to that processor and to place in its output FIFO stack the result of its computation, or a neutral value, for example a logical "1", depending upon its relative position with respect to the computation being performed, such that the processors perform multiple computations and place either their portion of computational output, or a "1", as the case may be, at their outputs so as to properly sequence their outputs for proper logical flow to form the ultimate result.

The present invention thus provides a significant improvement in cost and speed for parallel pipelined processing, as compared with prior art configurations. It eliminates the need to have control over several processors by way of external arbitration logic to effect strict time division multiplexing, under bus master/slave protocol.

The foregoing and other objects, features and advantages of the invention will be apparent from the more particular description of the preferred embodiments of the invention, as illustrated in the accompanying drawings.

DETAILED DESCRIPTION OF THE PREFERRED EMBODIMENT

General

Figure 1:
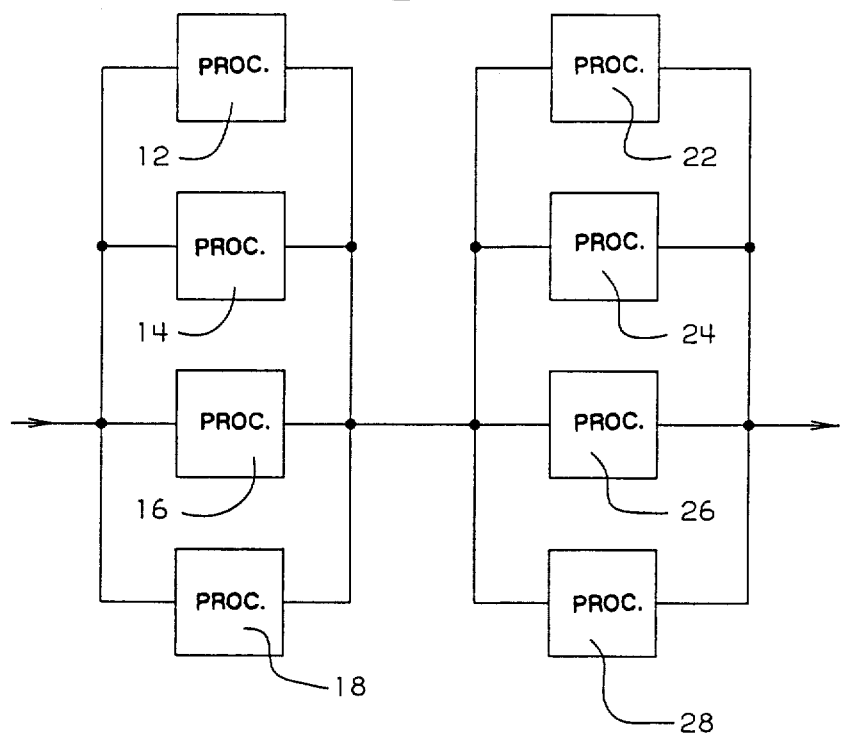
FIG. 1 shows a block diagram of a processing system according the the preferred embodiment of the present invention.

FIG. 1 illustrates a processing system 10 comprised of a parallel and pipeline configuration of processors 12-28. Such a configuration of processors is desirable, for example, when a number of multiplications such as matrix multiplications are to be performed. Pipelining and parallel processing permit multiplying the matrix in fewer cycles than is possible using a single processor.

Figure 2:
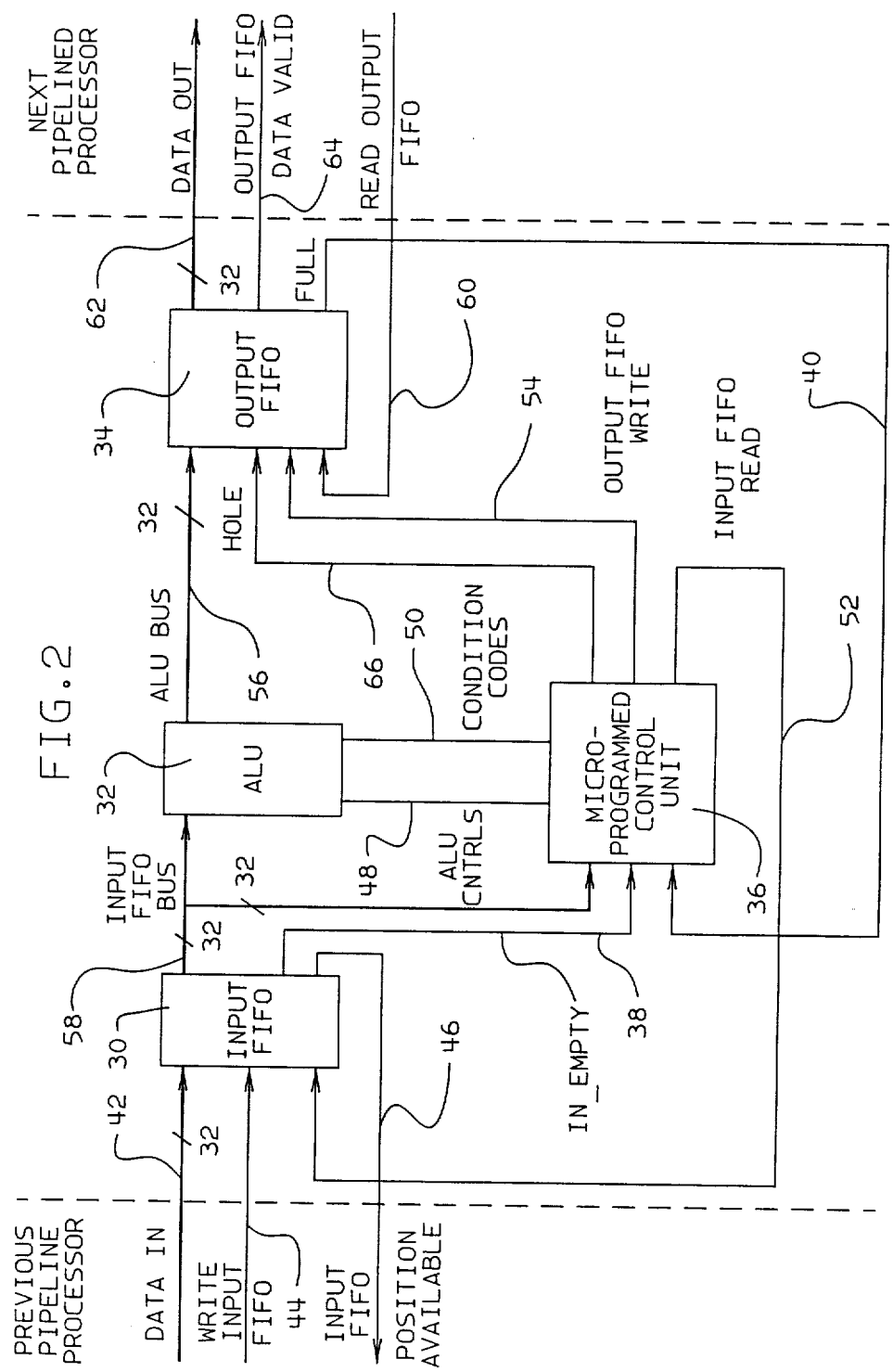
FIG. 2 shows a block diagram of an individual processor according to the preferred embodiment of the present invention.

FIG. 2 is a block diagram of a processing element according to he preferred embodiment of the present invention, comprising an INPUT FIFO 30, ALU 32, OUTPUT FIFO 34, and MICROPROGRAMMED CONTROL UNIT ("MCU") 36. This combination together makes up a complete, individual processing element, such as one of the processors 12-28 (FIG. 1). Important to the present invention is the OUTPUT FIFO 34 and its connections within and external to the processing element which contains it.

Each such processing element is under the control of its MCU 36. This type of control unit is well known. It is configured to have the ability to control the reading of data from an input device, control the functions of the ALU 32, and to control writes to an output device. In addition, it is configured to be able to test the status of the EMPTY line 38 from the INPUT FIFO 30, and the FULL line 40 from the OUTPUT FIFO 34, and under the appropriate conditions, to wait in idle cycles based on the status of these lines. It is configured to generate idle cycles when the microprogram attempts to either read an empty INPUT FIFO 30, or write a full OUTPUT FIFO 34. It continues to execute idle cycles until some other processing element puts data in its INPUT FIFO 30 or takes data out of its OUTPUT FIFO 34, whichever is appropriate. The ROM for the storage of the microcode programs is contained within MCU 36 and is not shown.

The functions of the ALU 32 in the preferred embodiment include floating point multiplication and addition so as to allow high speed computation of matrix multiply algorithms as this is considered a desirable application. In addition, the ALU contains a register file which consists of 32 registers, each of which is 32 bits wide. The Weitek WTL 3332 32-bit floating point data path chip is suitable for use as ALU 32, as it contains all of the necessary functions and connections herein described. Note, however, that the Weitek 3332 contains an additional input port that is not needed in this application and is left unconnected. INPUT FIFO 30 provides buffering which assists in the smooth operation of the processing element, particularly when pipelined. It is similar in construction to the OUTPUT FIFO 34, both described below in more detail.

The other lines shown in FIG. 2, namely the DATA IN line 42 over which input information elements are received, a WRITE INPUT FIFO line 44, the INPUT FIFO POSITION AVAILABLE line 46, the ALU CONTROL line 48, CONDITION CODES line 50, INPUT FIFO READ line 52, OUTPUT FIFO WRITE line 54, ALU BUS line 56, INPUT FIFO BUS 58, READ OUTPUT FIFO line 60, DATA OUT line 62, are all standard lines having standard features implemented according to well known techniques in the prior art. OUTPUT FIFO DATA VALID 64 and HOLE line 66 are described in more detail below.

Before describing the operation of the OUTPUT FIFO 34 shown in FIG. 2, a brief description of the concept of a "hole" will now be presented. A more detailed description of the operation of a "hole" or neutral value information element is presented further below herein.

Figure 3A:
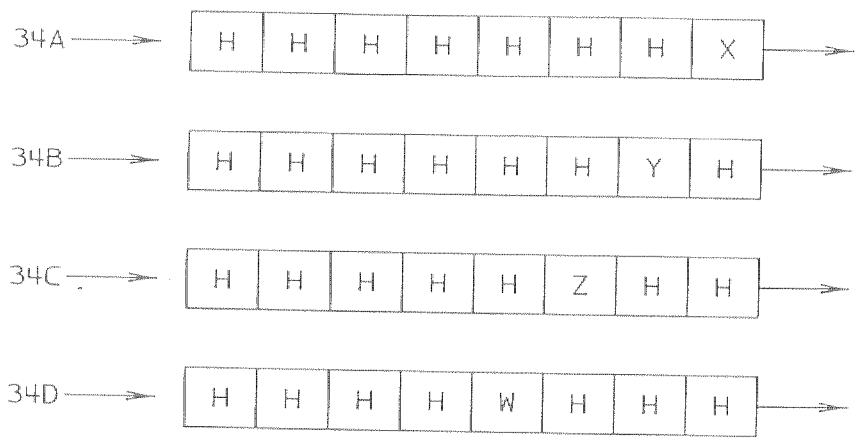
FIGS. 3A and 3B are representations of the contents of the output FIFOs of several processors according to the present invention connected in parallel.
Figure 3B:
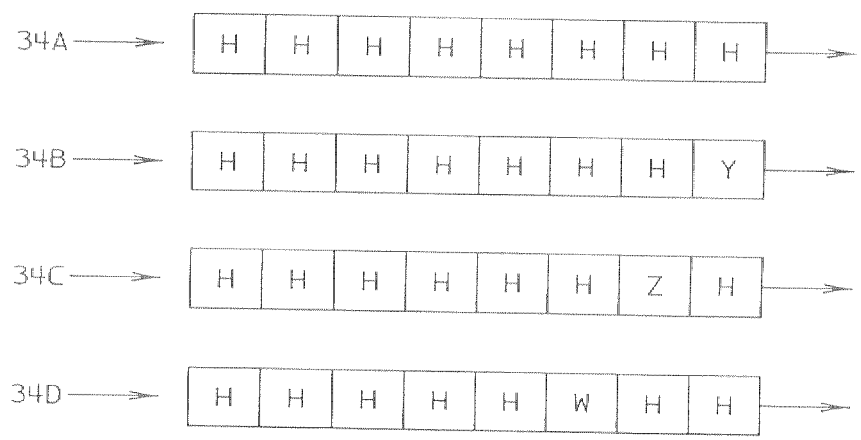

FIGS. 3A and 3B are representations of the contents of OUTPUT FIFOs 34A-D for the four processors 12, 14, 16, 18, respectively. In these diagrams an "H" represents a data "hole", a place keeper in the FIFO register, and no data. In the preferred embodiment, a hole is created by the loading of all "1s" in that register location. The register contents are the result of, for example, vector calculation being performed, in which the quantities X, Y, Z, and W are calculated, in parallel, by the respective processors 12-18. These processors are programmed such that their respective results appear sequentially one after the other at their outputs.

In FIG. 3A, the result of the calculation of the value X appears at the output of FIFO 34A. Holes appear at all of the other OUTPUT FIFOs 34C-D. As mentioned above, the output drivers of the output FIFOs are open collector in the preferred embodiment. Since the holes or neutral value information data element are data "1s", the value appearing on the output bus to which all of the output FIFOs are connected will be the value X, unaffected by the contents of any of the other output FIFOs.

FIG. 3B shows the contents of these output FIFOs one cycle later, with the result of the Y computation being presented at the output of OUTPUT FIFO 34B. Holes appear at all of the other OUTPUT FIFOs 34A, C, D. It is thus apparent how, by the loading of holes at appropriate locations, parallel computations may be performed, and the results of these computations placed sequentially on an output bus to which all of the parallel processors are connected.

Figure 4:
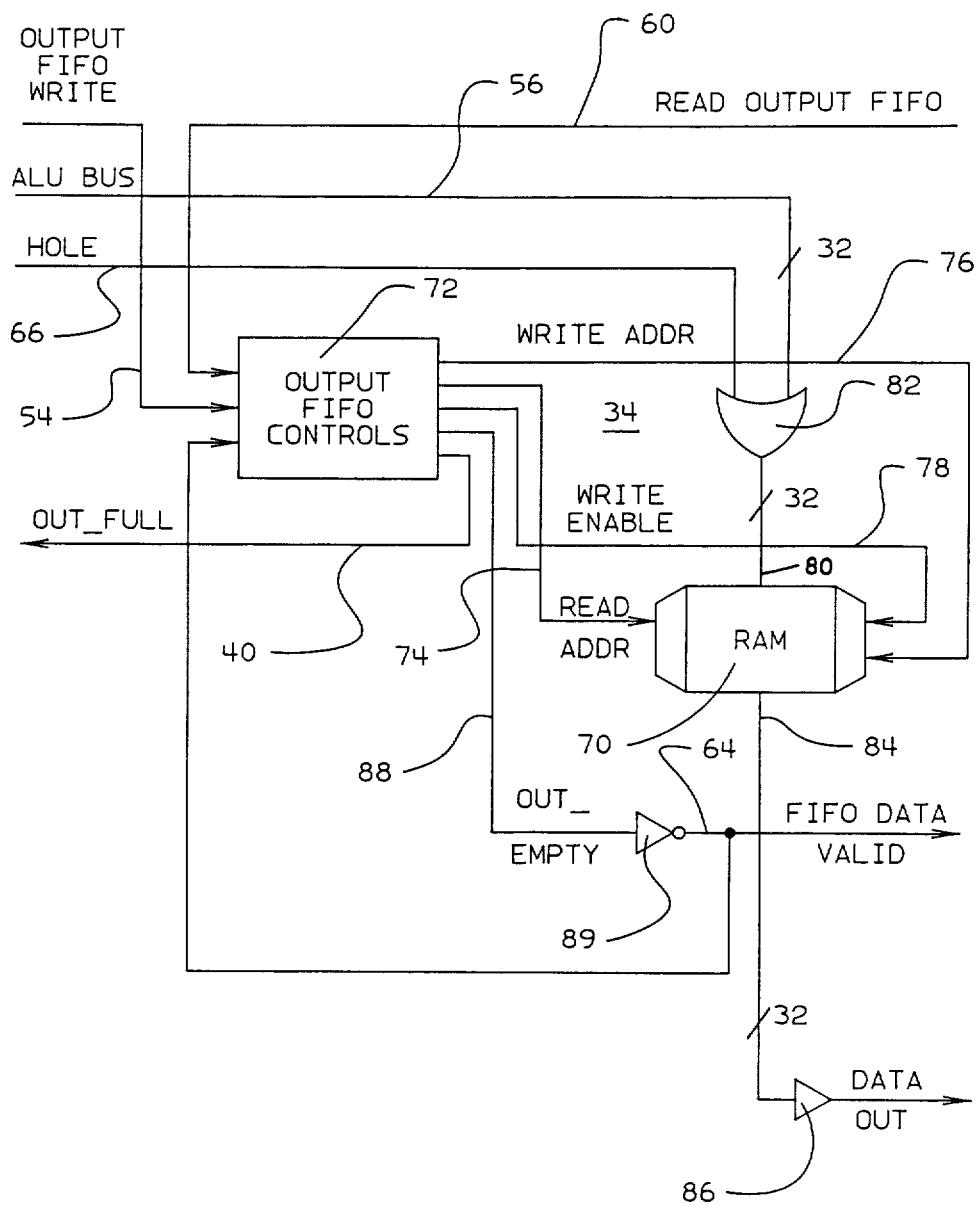
FIG. 4 shows a more detailed diagram of the output FIFO of the processor shown in FIG. 2.

Returning now to FIG. 2, OUTPUT FIFO 34 is a synchronous FIFO in that it is clocked by a single system clock that is brought to each processing element. The input side of OUTPUT FIFO 34 and the output side of the OUTPUT FIFO 34 are run at the same clock rate. FIG. 4 shows in more detail the OUTPUT FIFO 34 of the preferred embodiment of the present invention. The OUTPUT FIFO 34 is built upon an 8×32 dual-port Random Access Memory ("RAM") 70, and the necessary logic, OUTPUT FIFO CONTROLS 72, to control it. This RAM 70 has standard READ ADDRESS input 74, WRITE ADDRESS input 76, and WRITE ENABLE input 78 which are provided by OUTPUT FIFO CONTROLS 72. It is capable of doing a read and a write on every cycle. The input bus 80 is the output of thirty two dual input OR gates 82. The inputs to the thirty two dual input OR gates are the individual bits of the thirty two bit wide ALU BUS 56, and common to all thirty two gates is the HOLE line 66. When active, the HOLE line 66 causes the input to the RAM 70 to be all "1s". The MCU 36 (FIG. 2) uses this line to generate the above-mentioned neutral value to be written to the OUTPUT FIFO 34.

The lines of the output bus 84 of the RAM 70 are connected as inputs to the non-inverting open collector drivers 86. The outputs of drivers 86 are taken out of the processing element for connection to the open collector drivers of the output FIFOs in other processing elements to which this processing element may be connected in parallel.

The OUTPUT FIFO CONTROLS 72 produces the FULL and OUTEMPTY signals in addition to the write address, read address, and write enable signals already mentioned. The OUTEMPTY signal line 8 is an input to inverting open collector driver 89 which is taken out of this processing element and connected in parallel with the outputs of the other inverting drivers of other output FIFOs in a manner similar to the DATA OUT BUS 62 described above.

The OUTPUT FIFO CONTROLS 72 receive as an input the READ OUTPUT FIFO line 60 and the OUTPUT FIFO WRITE line 54 and the OUTPUT FIFO DATA VALID line 64. The READ OUTPUT FIFO line 60 comes from the input FIFO controls of the processing element in the next stage. The OUTPUT FIFO WRITE line 54 is generated internally to this processing element by the MCU 36 (FIG. 2). The OUTPUT FIFO DATA VALID signal is generated by the DOT AND connection as previously described. It is important to note that the value on the OUTPUT FIFO DATA VALID line 64 is not simply the inversion of the OUTEMPTY line 88. It will be de-asserted if EMPTY is asserted, but it can be asserted only if all OUTPUT FIFOs to which it is connected in parallel are attempting to de-assert their respective internal EMPTY line due to the DOT AND function of the open collector driver. The OUTPUT FIFO DATA VALID 64 line represents that all parallel connected output FIFOs are not empty.

Figure 6:
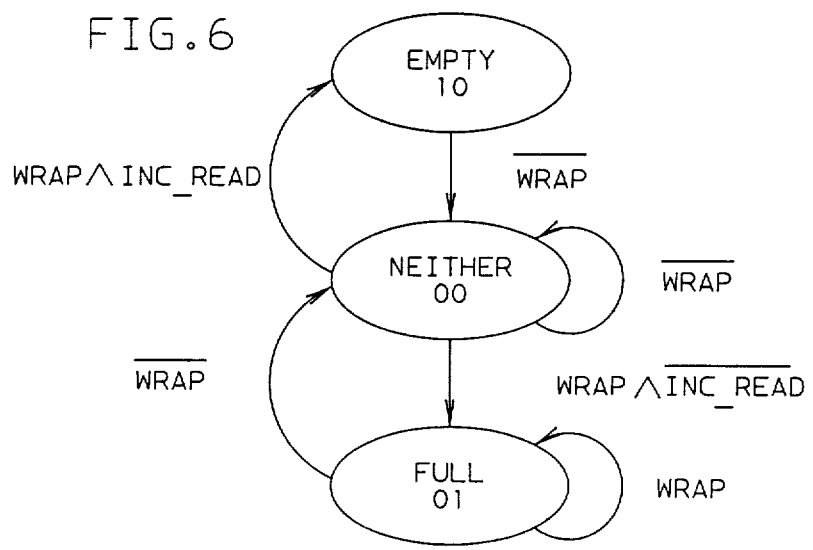
FIG. 6 shows the state diagram and next state equations for the state machine shown in FIG. 5.
Figure 5:
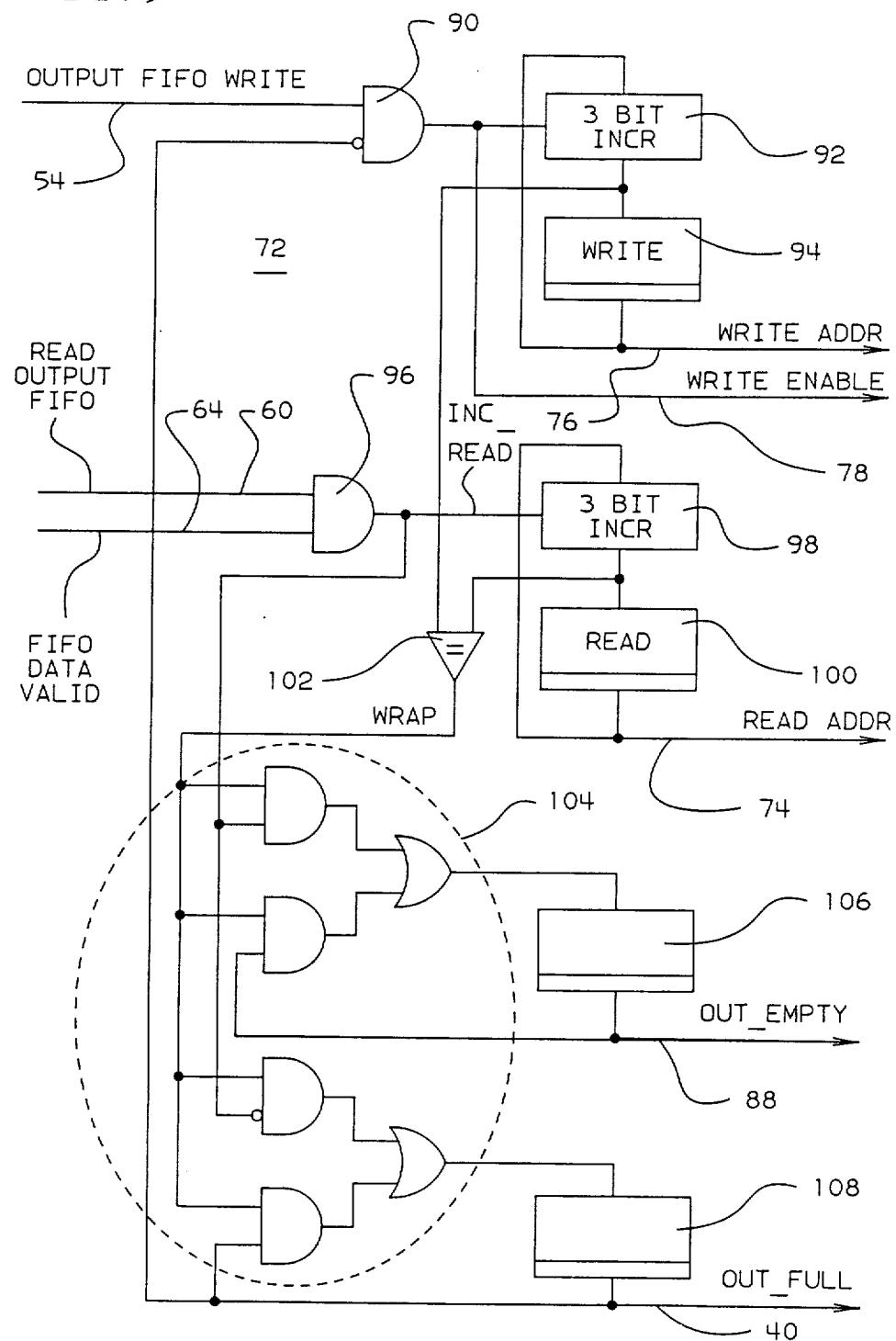
FIG. 5 is a more detailed diagram of the internals of the output FIFO controls of the output FIFO shown in FIG. 4.

FIG. 5 shows the internals of the OUTPUT FIFO CONTROLS 72 (FIG. 4). It contains write address logic comprising gate 90, THREE BIT INCREMENTER 92 and THREE BIT WRITE register 94. Similarly, it contains read address logic comprising gate 96, THREE BIT INCREMENTER 98, and READ register 100. In addition, it contains a state machine comprising three bit comparator 102, gates 104, single bit register 106, and single bit register 108. FIG. 6 shows the state diagram and next state equations for the state machine.

Referring again to FIG. 4, the READ and WRITE addresses are used as pointers into the dual ported RAM 70. The READ pointer is the top of the stack, the WRITE pointer is the bottom of the stack. The pointers are incremented in a circular fashion (i.e. they wrap to zero). If the pointers are ever equal, the FIFO is either empty or full.

The state machine keeps track of which state the pointers are in: 10 =empty, 00 =neither, 01 =full. Initially, the pointers are made equal and the state is set to the empty state by simple logic not shown. The empty state blocks reads. When a WRITE occurs, the WRITE pointer is incremented. This causes wrap to de-assert and neither state is entered. In neither, reads and writes are allowed. It remains in the "neither" state until the pointers become equal again. The INC-READ line 110, which indicates that a READ occurred, is used to determine whether to go to the full or return to the empty state. If the INC-READ line 110 is not active, the WRITE pointer moved on top of the read pointer which is the full condition. In the full condition, writes are blocked. When a READ occurs, the neither state is re-entered.

Figure 7:
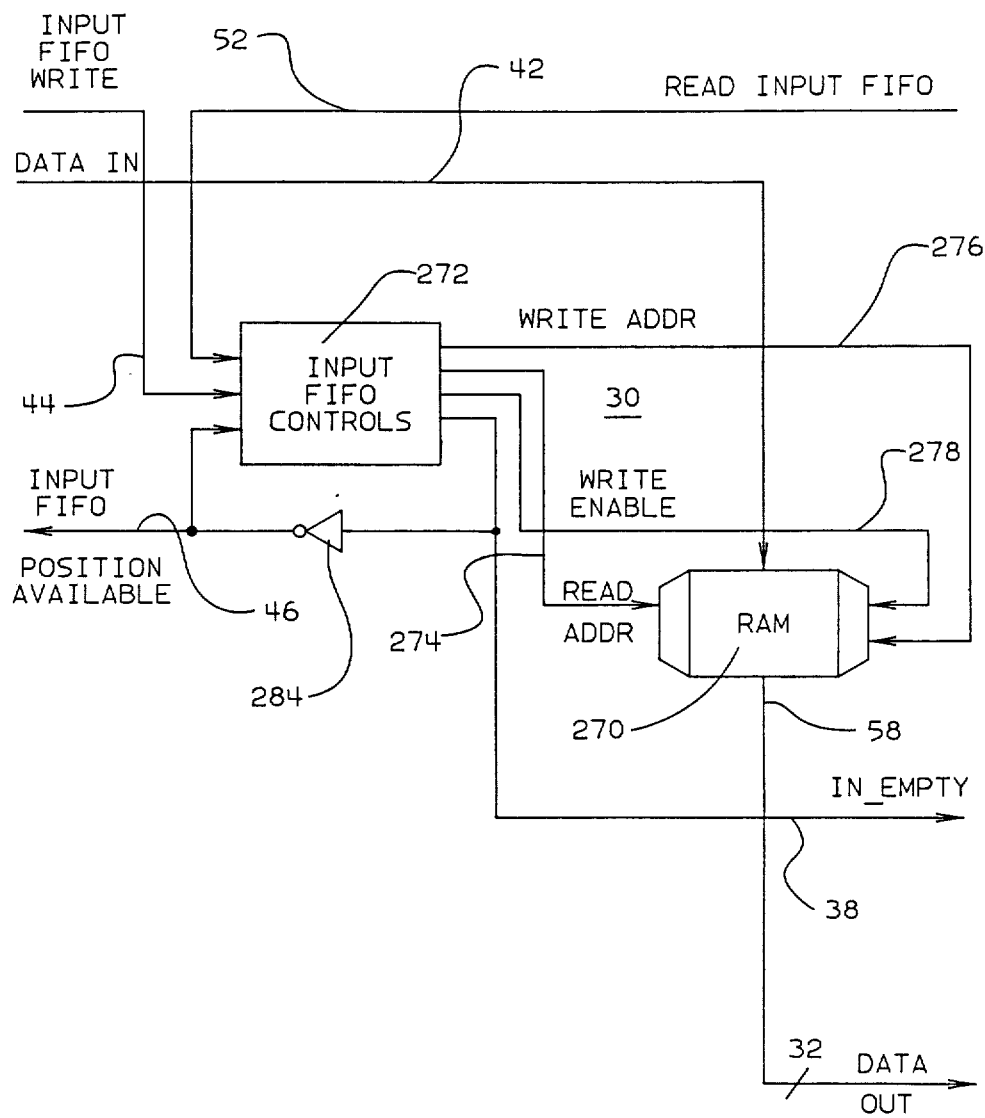
FIG. 7 shows a more detailed diagram of the input FIFO of the processor shown in FIG. 2.

FIG. 7 shows the INPUT FIFO 30 (FIG. 2) of the preferred embodiment of the present invention. As can be seen, the INPUT FIFO 30 is nearly identical to the OUTPUT FIFO 34 (FIG. 4). It is based around a dual port RAM 270 and the appropriate control logic, INPUT FIFO CONTROLS 272. The input bus of the RAM is the DATA IN bus 42 from the previous pipeline processor. There is no OR gate to generate the neutral value, such as OR gate 82 (FIG. 4). The OUTPUT bus 58 of the RAM is the input bus of the ALU 32, (see FIG. 2). The MCU 36 (FIG. 2) provides the READ INPUT FIFO line 52 and has as an input the INEMPTY line 38. This is in contrast to the OUTPUT FIFO (See FIG. 4) where the connections are to the WRITE OUTPUT FIFO line 54 and the OUTFULL line 40. The INEMPTY line 38 is connected to inverting open collector driver 284. The output of open collector driver 284 is the INPUT FIFO POSITION AVAIL line 46 which is connected in parallel with the other INPUT FIFO POSITION AVAIL lines on the other processors that are in parallel with this one. The control logic also receives the WRITE INPUT FIFO line 44 as an input. This line comes from the previous pipeline processor.

Figure 8:
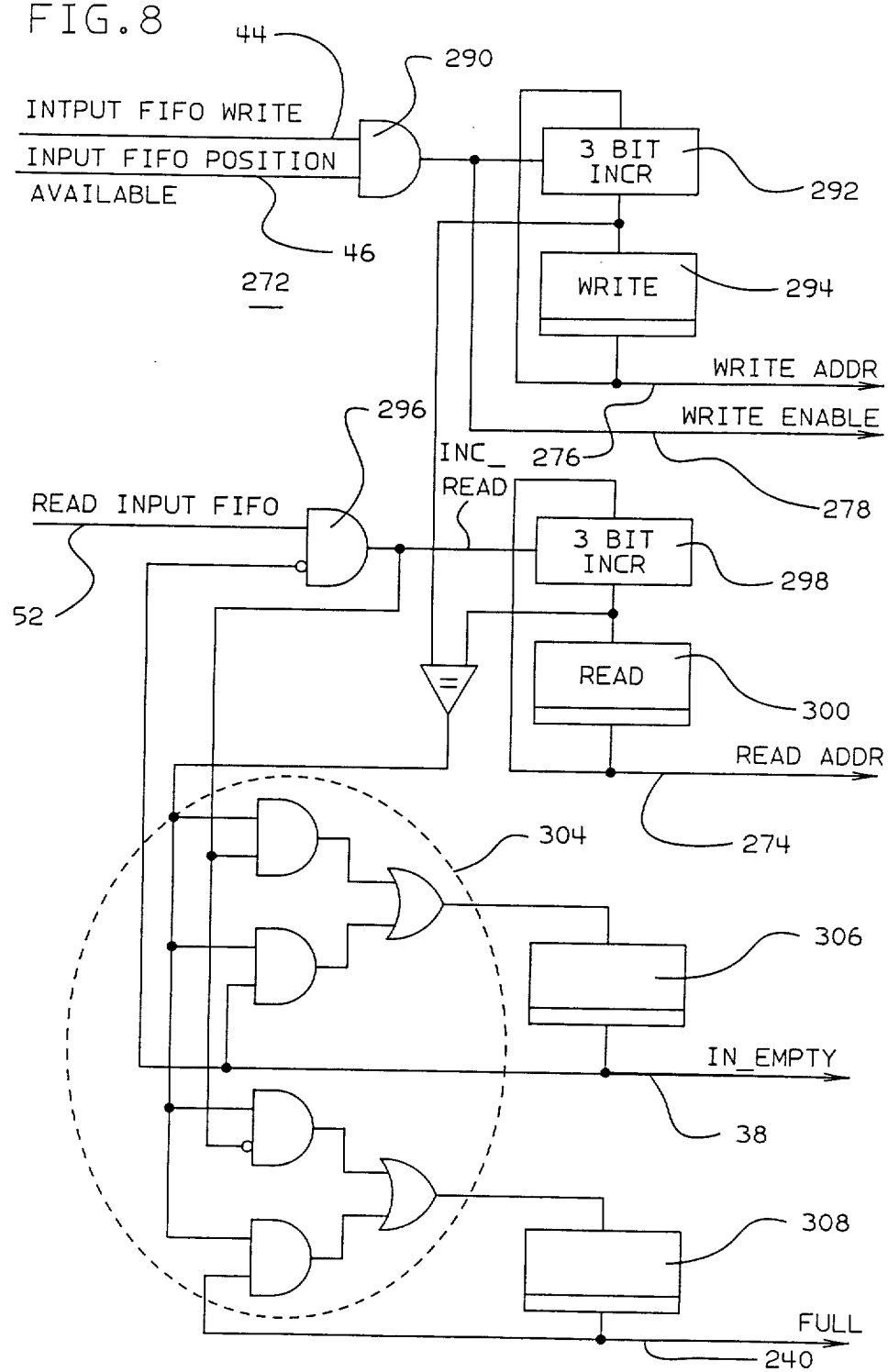
FIG. 8 shows the internals of the input FIFO controls of the input FIFO shown in FIG. 7.

FIG. 8 shows the internals of the INPUT FIFO CONTROLS 272 (FIG. 7). The only difference between the controls for the INPUT FIFO 30 and the OUTPUT FIFO 34 are the connections to gates 90 and 96 of the OUTPUT FIFO 34. In the INPUT FIFO 30, gate 290 has as inputs WRITE INPUT FIFO 44 and INPUT FIFO POSITION AVAIL 35. Gate 296 has READ INPUT FIFO line 52 and INEMPTY line 38 as inputs to the non-inverting and inverting inputs thereof. Other lines are as shown.

The processing element in the preferred embodiment as described above is specifically designed to be operated advantageously in parallel with other like processing elements. Very little microcode is necessary to support it. Executing coordinate transformation is an excellent example of the benefit of parallel multiple processing elements according to the preferred embodiment of the present invention. In typical graphic coordinate transformations, the coordinate is represented as a 1 by 4 matrix of data x, y, z, 1. The transformation is performed by multiplying this 1 by 4 matrix times a 4 by 4 matrix called the transformation matrix. This requires 12 multiplies and 9 additions. With the preferred embodiment, it is possible to use 4 processing elements in parallel each doing four multiplies and three adds. It is possible to do this in a completely pipelined fashion so that each processing element is reading a new data item and producing a new result on every cycle. Each processing element contains a single column of the transformation matrix in registers in its ALU. In parallel, each computes the result of the incoming 1 by 4 matrix times its 4 by 1 column matrix. By properly ordering the results, this produces the transformed coordinate. For normal graphics applications, a list of input points is supplied instead of a single coordinate. The four processing elements in parallel can be fed a consecutive stream of coordinate data and keep up with it, running at one data transfer in and out every cycle.

The programming support to do this is quite straightforward. The use of the input and output FIFOs and their transparent microcode idle cycles simplifies the synchronization of the chips. The only other support is the ability to generate a 'hole' in the output FIFO. To connect chips in parallel, the user simply ties the input and output pins together one for one. This includes the data busses as well as the FIFO handshaking lines.

Figure 9:
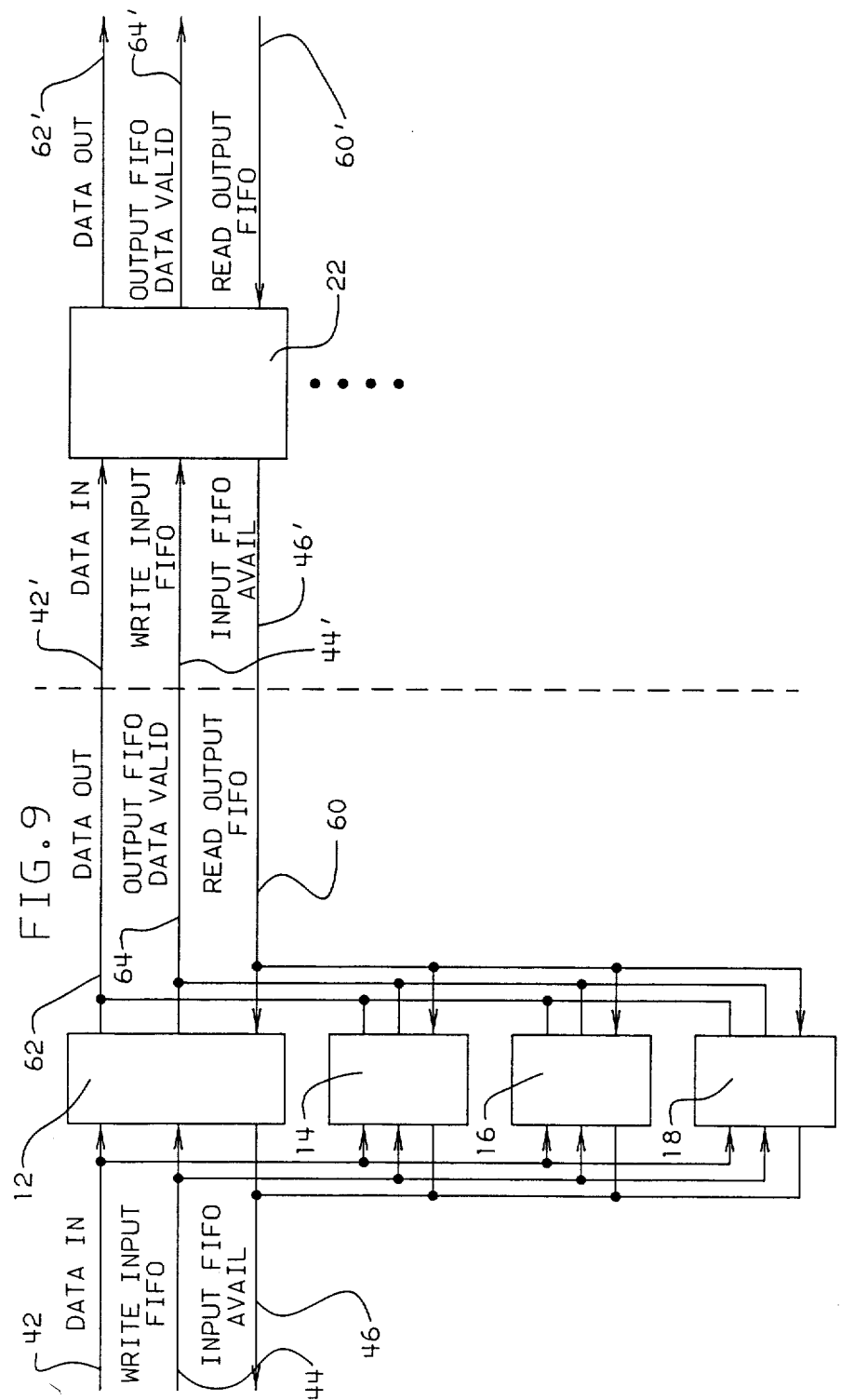
FIG. 9 is a diagram based on FIG. 1 that shows the connection of four processors in accordance with the preferred embodiment of the present invention.

FIG. 9 is a diagram based on FIG. 1, that shows the connection of the four parallel processing elements 12-18 feeding processing element 22 in a parallel/pipelined configuration. Processing elements 24-28 of FIG. 1 have been omitted in the interest of clarity. It will be understood that their inputs and outputs are connected in parallel in the same manner that the inputs and outputs of elements 12-18 are. The output drivers are constructed to be 'dot ANDing'. If a processing element is driving its output bus all high, it has no effect on the result of the dot ANDs. Any other element that is driving a low will cause the result to be low.

Figure 10A:
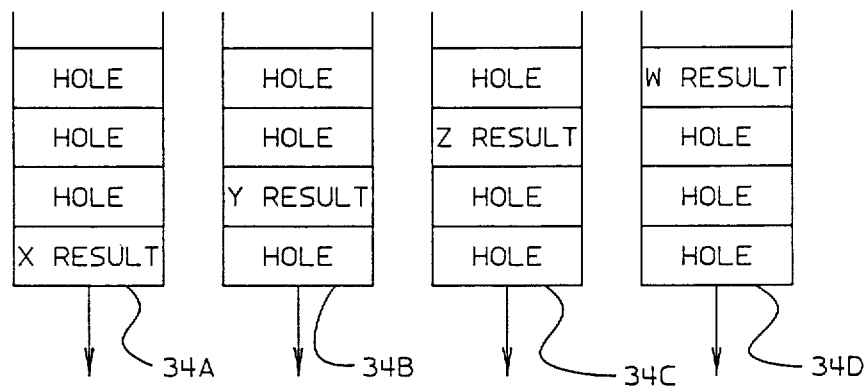
FIG. 10A and 10B are diagrams similar to the diagrams of FIGS. 3A and 3B.
Figure 10B:
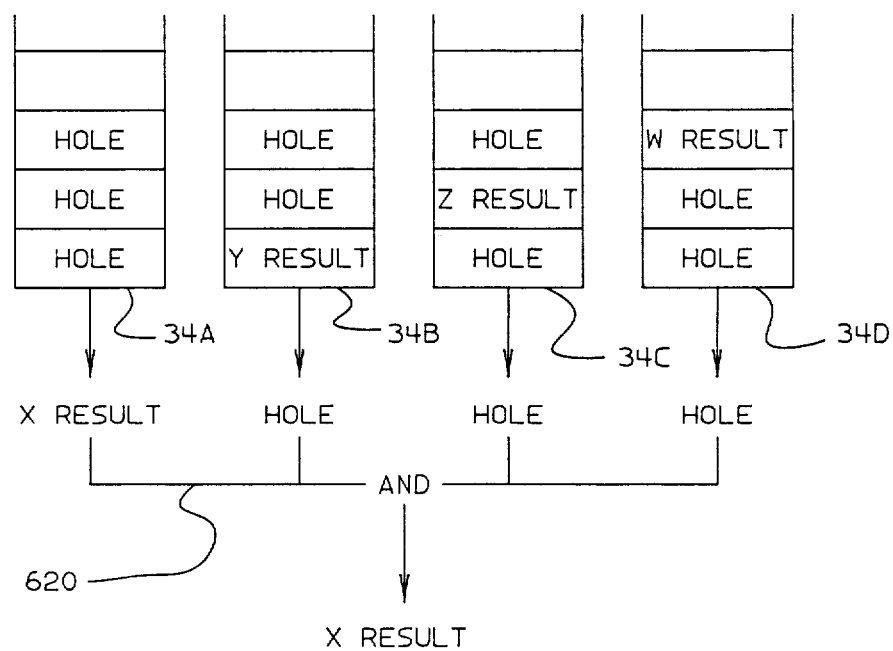

There is a control point (line 66, FIG. 4) to force the bus 62 going into the RAM 70 (FIG. 4) to be all ones. This is a 'hole'. To reiterate and expand on FIGS. 3A and 3B, and the supporting text therefore, FIG. 10A and 10B show the contents of the output FIFOs of four processing elements after completing a point transformation. In FIG. 10A we see the four FIFOs 34A-D with the data in them. Processing element A has a computed result at the bottom of FIFO 34A. The three other processing elements B-D have each placed a hole in their FIFOs 34B-D. When the data is read out as in FIG. 10B, the composite value on the dote ANDed output bus 620 is the desired result from processing element 1. Likewise, the rest of the results from the remainder of the processing elements 34B-D line up with a hole in every other processing element.

The preceding discussion implies that all of the processing elements must operate in lock step synchronization with each other. This is not necessary. As stated above, the FIFO handshaking lines are also dot ANDed. The lines from the four INPUT FIFOs (30, FIG. 2) that indicate there is at least one open position in the INPUT FIFO (line 46, FIG. 2, FIG. 9) are dot ANDed. The next stage in the pipeline sees the AND of each having one position available. This is: all have at least one position available. Likewise, the output FIFO handshaking line that indicates that there is at least one valid piece of data in the OUTPUT FIFO (line 64, FIG. 2, FIG. 9) is dot ANDing. The external world sees the composite of the ANDing which is that all processing elements have at least one valid piece of data.

Figure 11A:
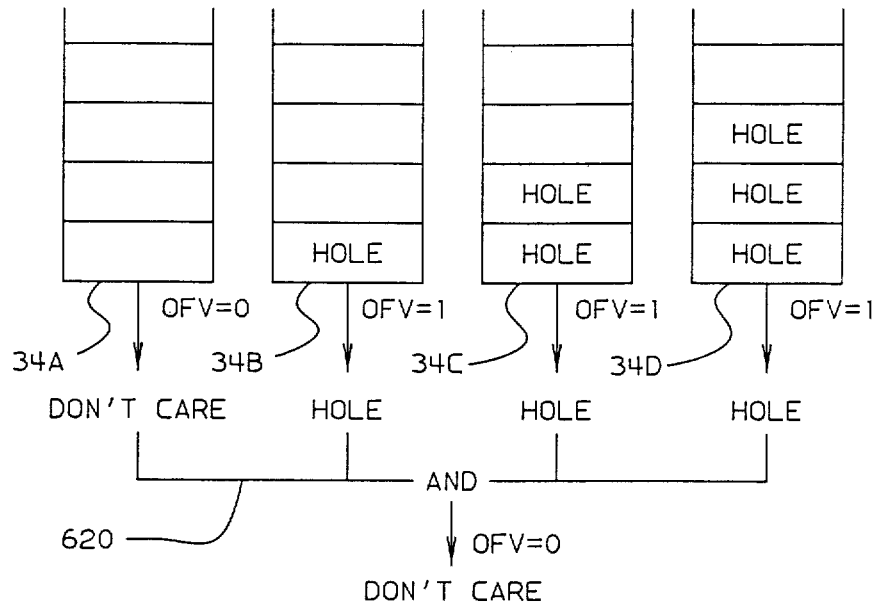
FIGS. 11A and 11B are diagrams similar to those shown in FIGS. 10A and 10B.
Figure 11B:
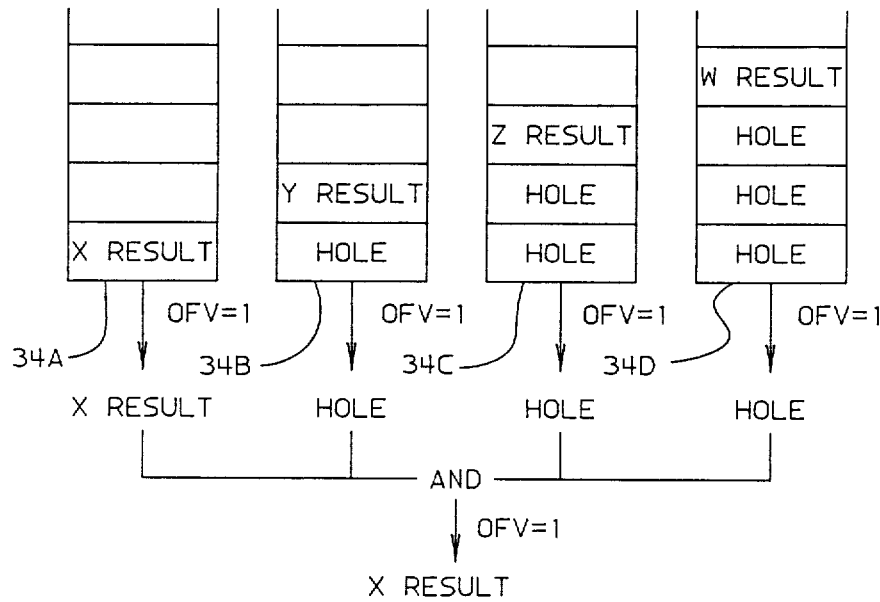

FIGS. 11A and 11B show a situation where this comes into play. FIG. 11A shows the state of the four OUTPUT FIFOs 34A-34D very early in the routine. All four processing elements are reading points in and calculating their result, but none of them have finished yet. All of the processing elements except element A have placed at least one hole in their OUTPUT FIFO 34B-D. FIG. 11A shows the condition of the line coming out of the output FIFO which indicates if the FIFO has at least one valid data item, i.e. the OFV state. Processing elements B-D are trying to drive the output FIFO data valid line high. Processing element A, however, is trying to drive it low. Since it is a dot AND, the composite line is low since one of the lines is low. This prevents the external world from removing any data from any of the chips. This ensures that the first hole in processing elements B-D, will line up with the first result as is desired. The input FIFO stays in synchronization in the same manner.

Using the processing elements in parallel is not limited to point transformation algorithms. Any algorithm that can be split into sections that work on a common input stream and produce a known number of results would be applicable. Strictly, it is not even necessary that the sections work on common data or apply the same algorithm to the data. Since each processing element has unique microcode, the first element could read the first n data items and discard the rest of the input stream. The second element could discard the first n items, read the next m, then discard the rest, and so on. The algorithms can run independently with different path lengths. It is only necessary that each processing element knows the order and quantity of results from every other processing element in parallel with it so that it can place the correct number of holes in the right positions in its output FIFO.

Thus, while the invention has been described with reference to preferred embodiments thereof, it will be understood by those skilled in the art that various changes in form and details may be made without departing from the scope of the invention.

We claim:

1. A computer system comprising: at least two processors each including;
   arithmetic logic unit means for receiving input information signal elements and providing output information signal elements,
   a first-in first-out output register stack means having a plurality of output data lines and a plurality of input data lines, said input data lines being connected to said arithmetic logic unit means for receiving output information signal elements therefrom and storing the same in the register stack,
   a program control unit connected to said arithmetic logic unit means for controlling the operation of said arithmetic logic unit and to the first-in first-out output register stack for providing neutral value information elements which are interspersed in said stack with the information elements from the arithmetic logic unit means all under control of the program control unit,
   said program control units being programmed such that in each corresponding address in the respective first-in first-out output register stack means not more than one program control unit can control the transfer of output information signal elements from its arithmetic logic unit to its stack means and all other program control units will supply neutral value information elements to the corresponding addresses in their first-in first-out output register stack means; and
   means connecting the respective output data lines of the said at least two first-in first-out output register stack means in parallel whereby during predetermined cycles of operation of said computer system output information signal elements from no more than one said first-in first-out output register stack are provided by said parallel connected output data lines.

2. A computer system comprising:
   at least two processors each including;
   arithmetic logic unit means for receiving input information signal elements and providing output information signal elements,
   a first-in first-out output register stack means having a plurality of output data lines and a plurality of input data lines, said input data lines being connected to said arithmetic logic unit means for receiving output information signal elements therefrom and storing the same in the register stack, and a control line for indicating when said register stack means is not empty,
   a program control unit connected to said arithmetic logic unit means for controlling the operation of said arithmetic logic unit and to the first-in first-out output register stack for providing neutral value information elements which are interspersed in said stack with the information elements from the arithmetic logic unit means all under control of the program control unit,
   said program control units being programmed such that in each corresponding address in the respective first-in first-out output register stack means not more than one program control unit can control the transfer of output information signal elements from its arithmetic logic unit to its stack means and all other program control units will supply neutral value information elements to the corresponding addresses in their first-in first-out output register stack means; and
   means connecting the respective output data lines and the said control line of the said at least two first-in first-out output register stack means in parallel whereby during predetermined cycles of operation of said computer system when said control lines all indicate that their respective register stack means are not empty output information signal elements from no more than one said first-in first-out output register stack means are provided by said parallel connected output data lines.

* * * * *